United States Patent [19]

Yeates et al.

[11] 4,187,600
[45] Feb. 12, 1980

[54] APPARATUS FOR MACHINING RAILROAD TRUCK BOLSTERS

[75] Inventors: Richard P. Yeates, Downers Grove; Boris S. Terlecky, Fox Lake; Jagdish K. Shah, Chicago, all of Ill.

[73] Assignee: Trailer Train Company, Chicago, Ill.

[21] Appl. No.: 945,837

[22] Filed: Sep. 26, 1978

[51] Int. Cl.² .......................................... B23P 23/00
[52] U.S. Cl. ..................................... 29/564; 29/565; 408/22
[58] Field of Search ............. 29/564, 565, 33 R, 26 A, 29/56.5; 90/15 R; 408/22, 25, 26, 31

[56] References Cited

U.S. PATENT DOCUMENTS

| | | | |
|---|---|---|---|
| 2,008,083 | 7/1935 | Mueller | 90/17 |
| 2,391,511 | 12/1945 | Pioch, et al. | 29/33 R |
| 3,066,782 | 12/1962 | Olton | 192/142 |
| 3,230,832 | 1/1966 | Cox | 90/11 R |
| 3,581,623 | 6/1971 | Galbarini | 90/14 |
| 3,780,619 | 12/1973 | Kitatiura et al. | 90/15 |
| 3,833,312 | 9/1974 | Miles et al. | 29/564 X |
| 3,998,127 | 12/1976 | Rotieu | 90/14 |

*Primary Examiner*—Gil Weidenfeld
*Attorney, Agent, or Firm*—Haight, Hofeldt, Davis & Jambor

[57] ABSTRACT

Disclosed is an apparatus for machining the bolster bowl surface, the bolster pocket surfaces, the fulcrum pin hole surface and the bolster gib surfaces of railroad truck bolsters. The apparatus includes a base, a fixture mounted for rotation on the base and clamps on the fixture for clamping the bolster rigidly to the fixture. A locating template is utilized to properly position the bolster on the fixture, and once properly positioned and clamped, the fixture can be rotated and locked in a plurality of different positions to permit machining of the various surfaces. To machine the bolster pocket surfaces, the fulcrum pin hole surface, and the bolster gibs, a first machining (milling) head is provided that is movable along three perpendicular axes. To accomplish machining of the bolster bowl surface, a second machining (boring/facing) head is provided that is pre-aligned so that once the bolster is properly positioned with the locating template, the second machining head need only be moved along one axis to machine the bolster bowl. The second machining head has a combination boring and facing tool mounted thereon which can accomplish both a boring and facing operation simultaneously to machine the bolster bowl in a single operation.

11 Claims, 20 Drawing Figures

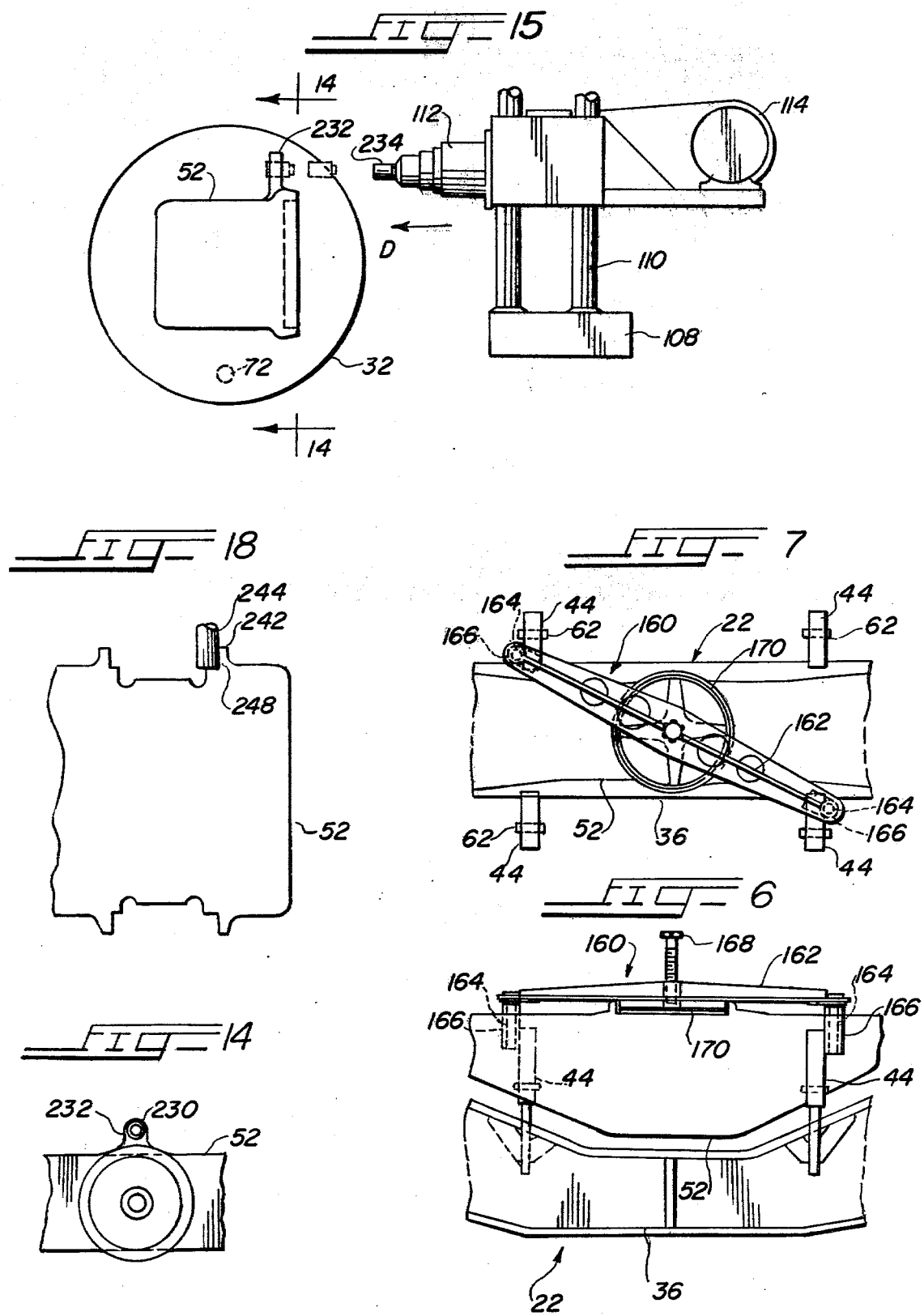

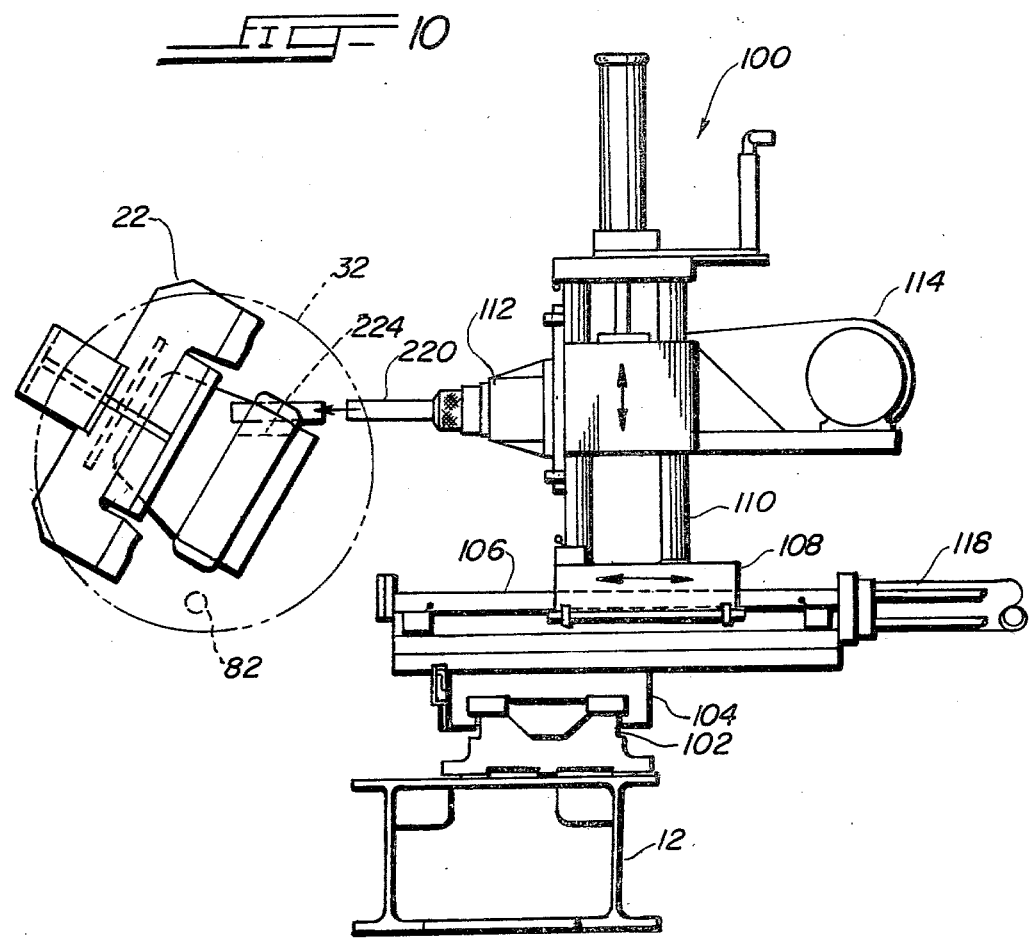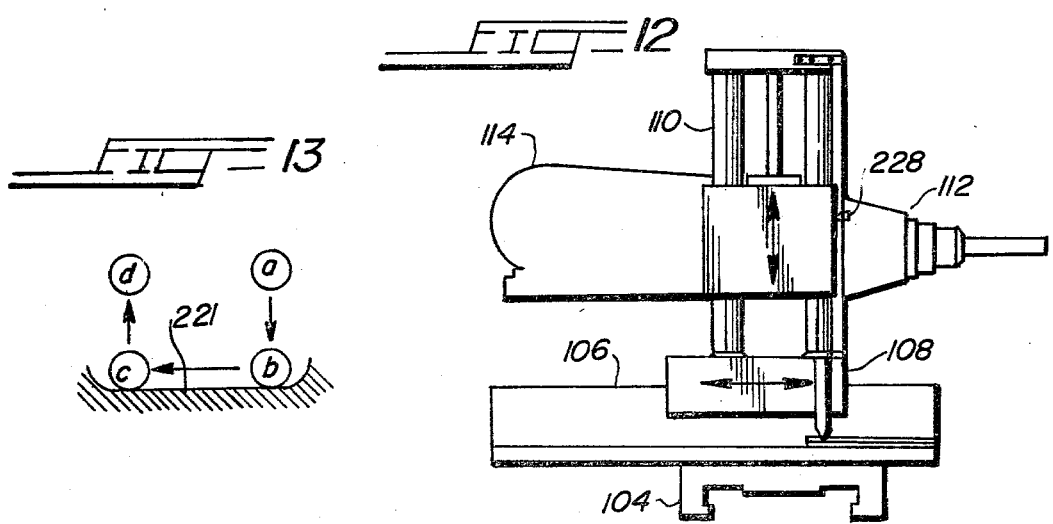

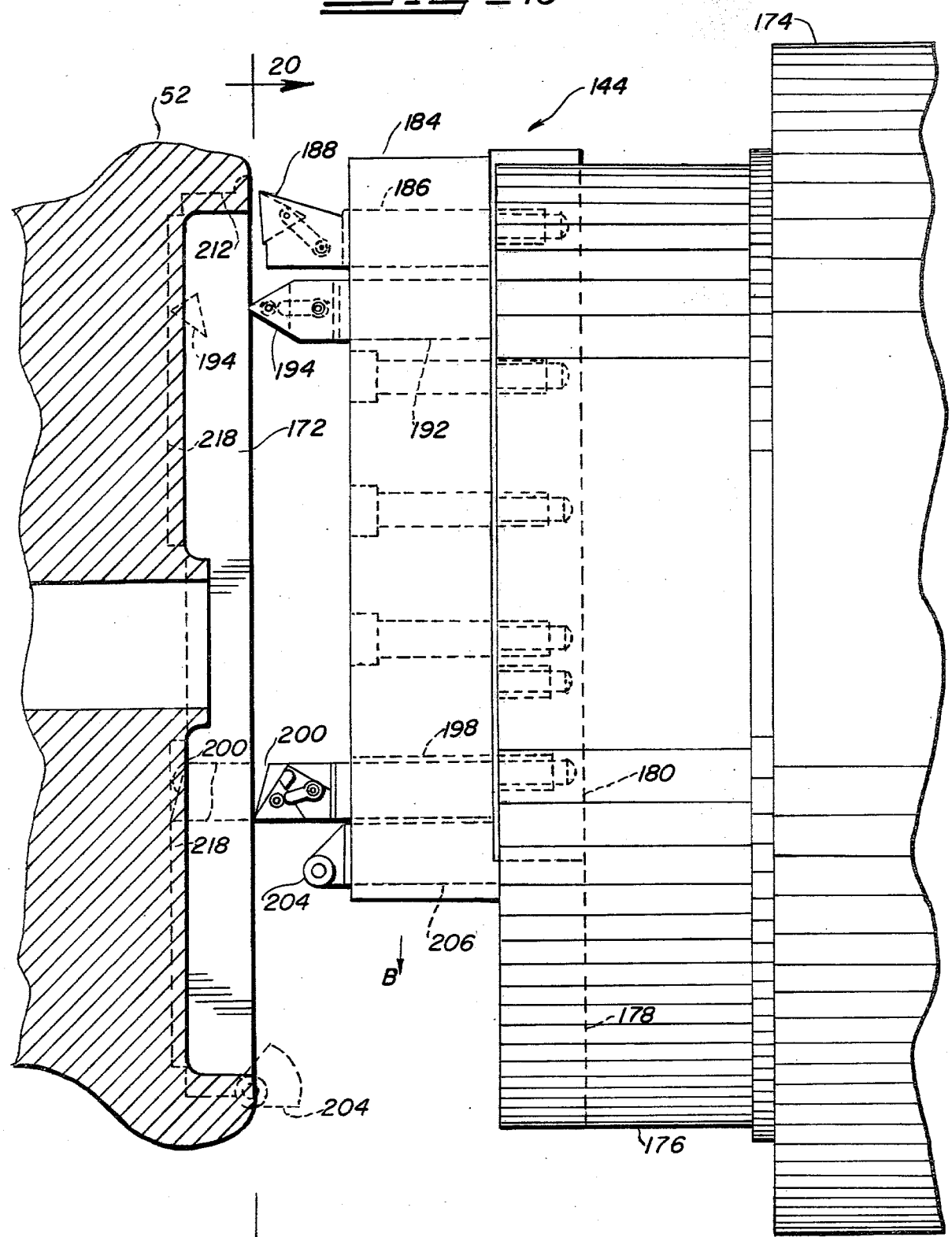

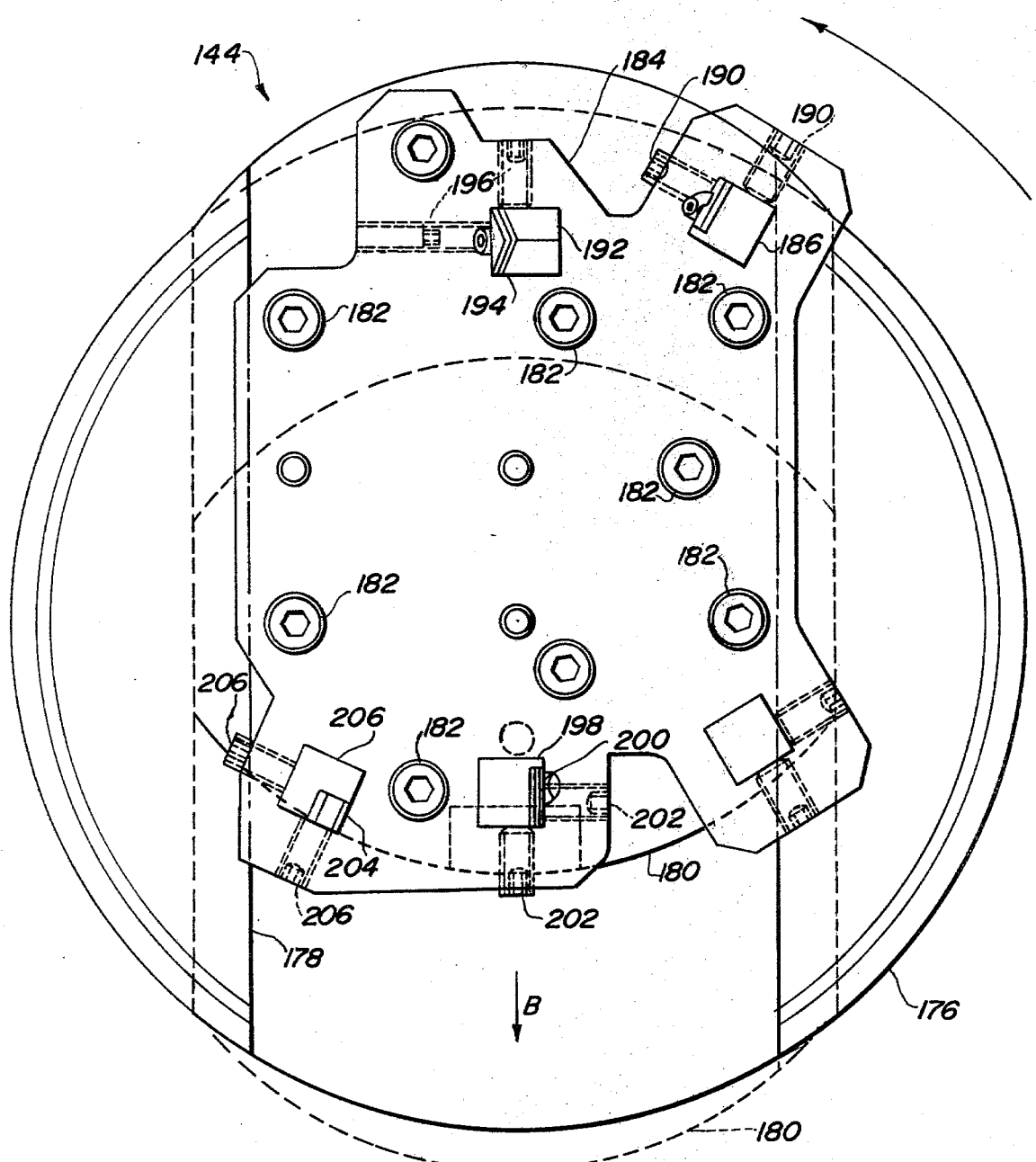

APPARATUS FOR MACHINING RAILROAD TRUCK BOLSTERS

BACKGROUND OF THE INVENTION

1. Field of the Invention

The present invention relates to apparatus for machining railroad truck bolsters of various load capacities. More particularly, the present invention relates to apparatus which permits machining of a plurality of critical wear surfaces of railroad truck bolsters without removing the bolster from the apparatus once it is properly positioned in the apparatus.

2. Description of the Prior Art

Because of the tremendous frictional and wear forces experienced by railroad wheel trucks, various wear surfaces of those trucks are subjected to severe friction and abrasion. Consequently, these critical surfaces of the railroad truck must be periodically repaired to allow extended life of an otherwise serviceable railroad wheel truck. In this regard, the worn surfaces must be machined to remove the pitted and worn surface and a new surface in the form of a wear plate of a predetermined thickness must be welded to rebuild the worn surface. Heretofore, bolsters of railroad wheel trucks have been machined by conventional machining apparatus which has not been specifically designed or adapted for machining such bolsters. Thus, substantial setup time has been required to assure proper machining of those surfaces, and additional setup time is required each time a different surface is machined. Some attempts have been made in the past to provide machining equipment especially adapted for machining railroad trucks. However, such attempts have not proved to be commercially acceptable. For example, U.S. Pat. No. 2,008,083—Muller discloses one such prior art apparatus which has never achieved commercial success in this country.

Accordingly, it would be a highly desirable advance in the art to provide an apparatus for machining the critical wear surfaces of a railroad bolster that permits highly accurate machining of those surfaces at greater speed, economy and convenience than has been permissible using prior art conventional machining apparatus.

BRIEF DESCRIPTION OF THE INVENTION

An apparatus for machining railroad wheel truck bolsters in accordance with the present invention comprises a base having a fixture mounted on the base for rotation about an axis. The fixture includes clamp means to clamp the truck-bolster on the fixture in a predetermined position. Rotating means are provided for rotating the fixture about the axis to different selectable predetermined positions so that the truck bolster is oriented in proper position for machining a particular critical surface. Lock means are provided for locking the fixture in a selected one of said predetermined positions. A first machining (milling) head is mounted on one side of the fixture for sliding movement in a first direction horizontally and parallelly to the axis of rotation of the fixture, in a second direction horizontally and perpendicularly to the axis of rotation of said fixture, and in a third direction vertically and perpendicularly to the axis of rotation of said fixture so that certain critical surfaces of the bolster can be machined by said first machining head when the fixture is in certain ones of the predetermined positions. A second machining (boring/facing) head is mounted on the other side of the fixture for movement in a direction horizontally and perpendicularly to the axis of rotation of said fixture. The machining head has a combined boring and facing tool mounted for rotation on the machining head and the boring and facing tool is adapted to machine the bolster bowl surface of the bolster when the fixture is in one of the predetermined positions.

The certain critical surfaces of the bolster which may be machined by the first machining head are the bolster pocket surfaces, the fulcrum pin hole surface, and the bolster gib surfaces. The fixture may be rotated between the various predetermined positions and locked in selected ones of those predetermined positions so that each of the surfaces may be machined in turn.

Locating means may also be provided for properly positioning the bolster on the fixture before the clamp means are used to clamp the bolster to the fixture.

Thus, it is a principal object of the present invention to provide an apparatus for machining certain surfaces of a railroad truck bolster without the necessity of removing the bolster from the apparatus once it is properly positioned on the apparatus. Yet another object of the present invention is to provide an apparatus for machining the bolster bowl surface of railroad truck bolsters that allows the bolster bowl to be both bored and faced with a single machining head during a single operation to provide even, equal height and quality machining surfaces.

These and other objects, advantages and features shall hereinafter appear, and for the purposes of illustration, but not for limitation, an exemplary embodiment of the present invention is illustrated in the accompanying drawings and described in the following detailed description.

BRIEF DESCRIPTION OF THE DRAWINGS

FIG. 6 is a side partially fragmentary view of the fixture and bolster showing the locating template used for positioning the bolster on the fixture.

FIG. 7 is a top fragmentary view of the fixture, bolster and locating template illustrated in FIG. 6.

FIG. 10 is a side partially fragmentary view of the first machining head showing the position of the fixture and bolster during machining of the bolster pocket surfaces.

FIG. 12 is a side view of the first machining head taken from the side opposite that is shown in FIG. 10 illustrating the positional gauges on the first machining head.

FIG. 13 is a schematic view showing the movement of the tool during machining of the bolster pockets.

FIG. 14 is a partially fragmentary view of the bolster showing the bolster fulcrum pin hole.

FIG. 15 is a side partially fragmentary view of the first machining head and the fixture showing the movement of the first machining head during machining of the fulcrum pin hole.

FIG. 18 is a top fragmentary view of the end of the bolster showing the tool position when machining the bolster gib surfaces.

FIG. 19 is a side partially fragmentary view of the boring and facing tool used to machine the bolster bowl surface of the bolster.

FIG. 20 is a front view taken substantially along line 20—20 in FIG. 19.

DETAILED DESCRIPTION OF THE PREFERRED EMBODIMENT

Figure 1:
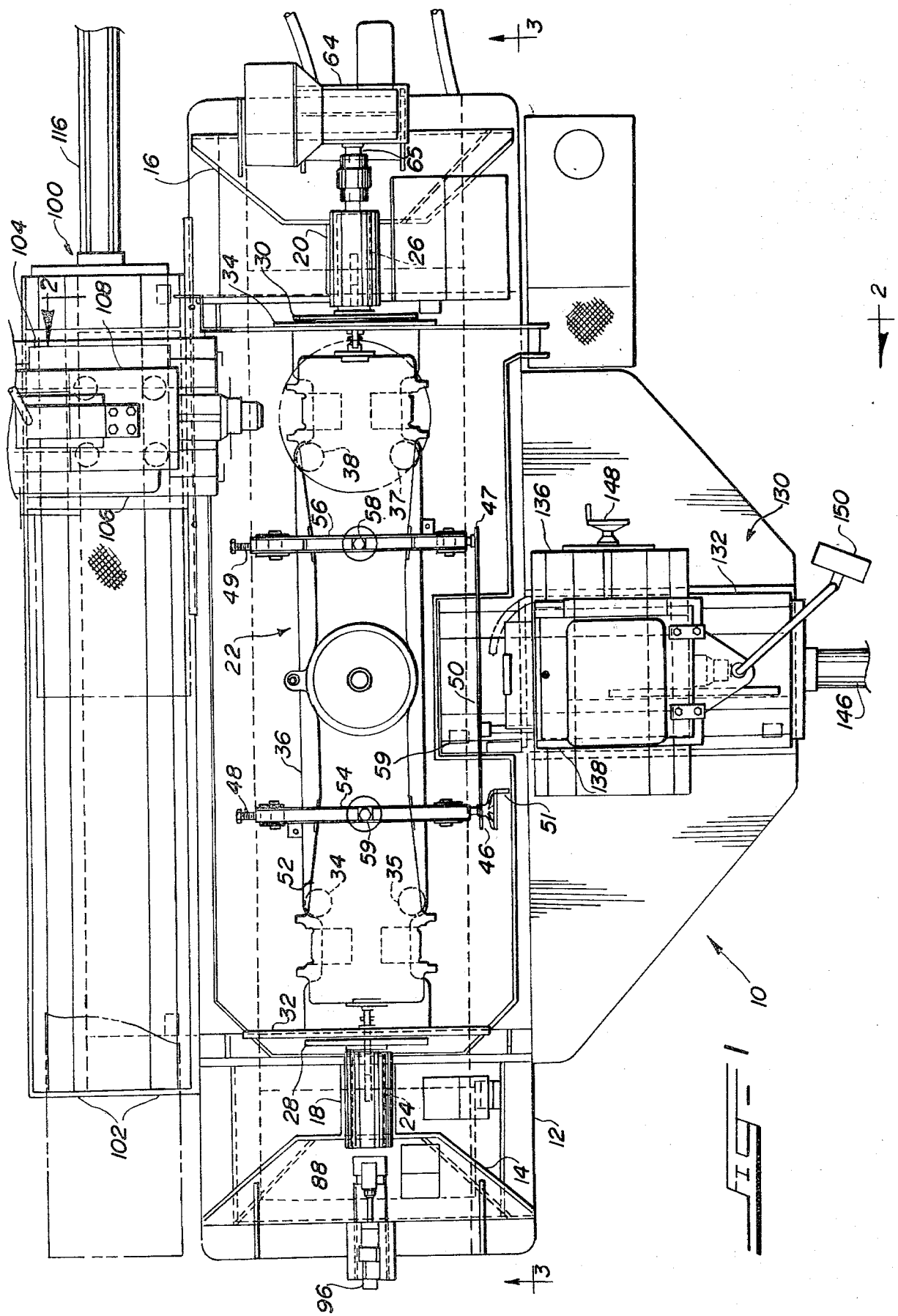
FIG. 1 is a top plane view of the preferred embodiment of the present invention.
Figure 2:
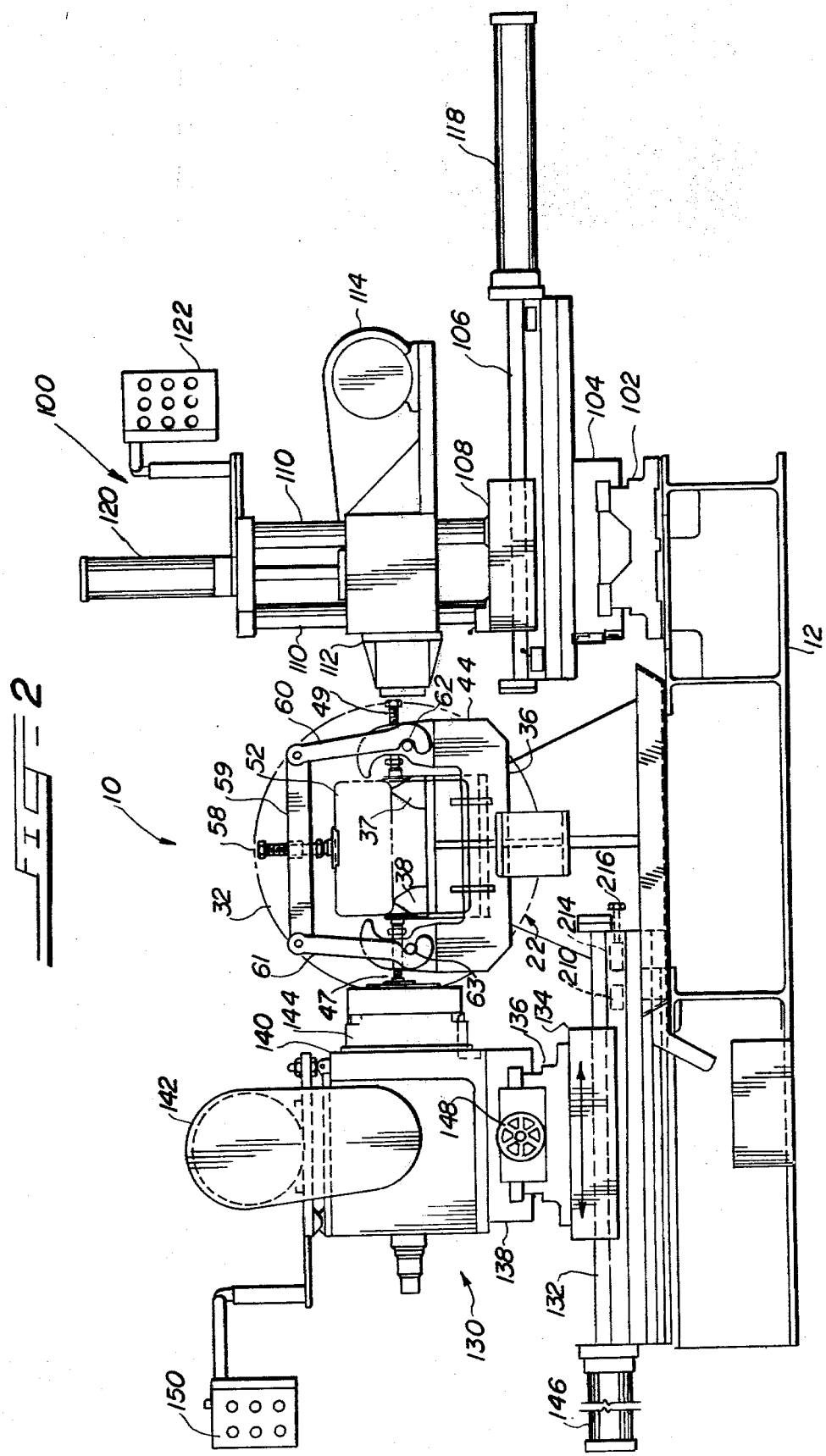
FIG. 2 is a cross-sectional end view taken substantially along line 2—2 in FIG. 1.
Figure 3:
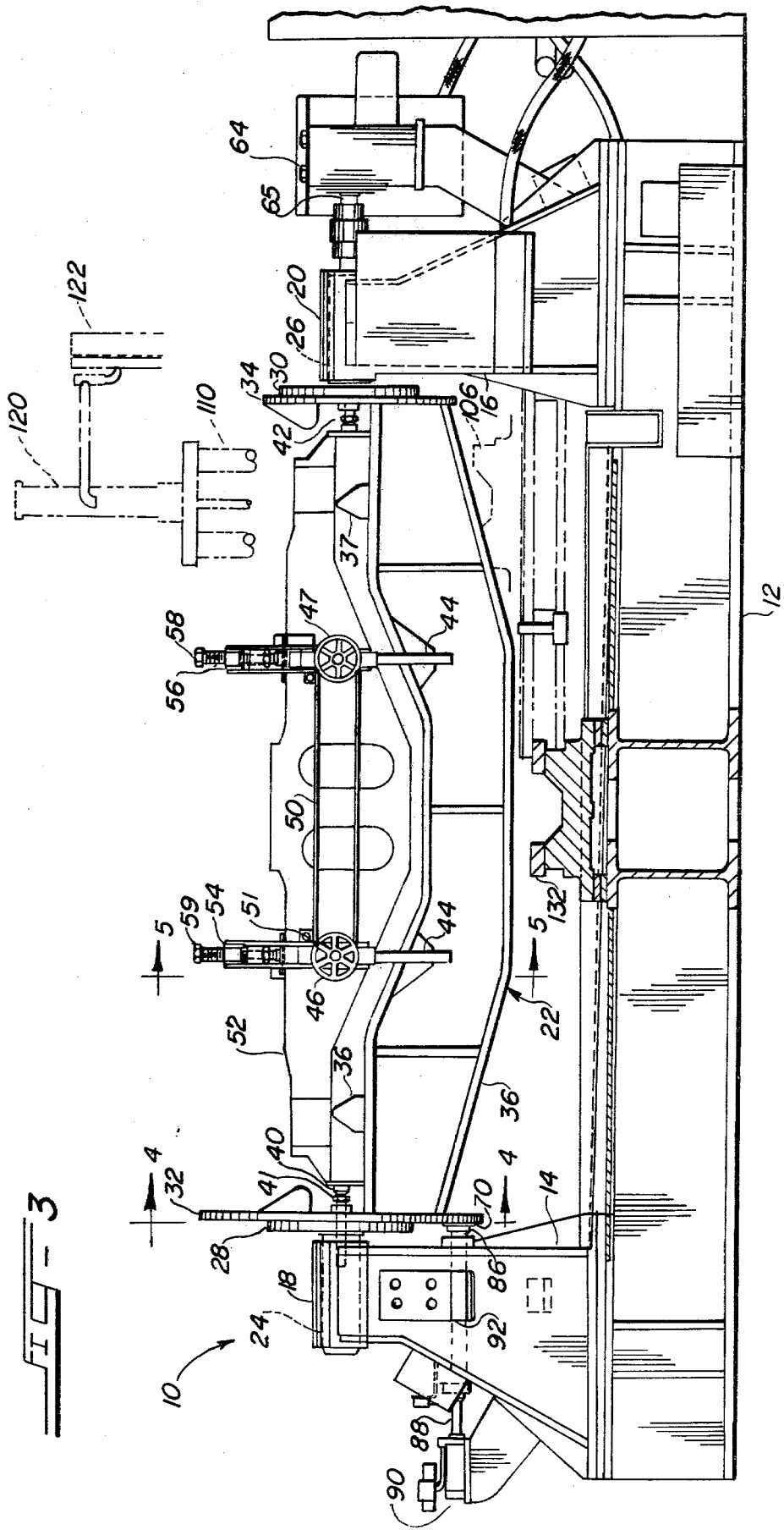
FIG. 3 is a cross-sectional side view taken substantially along line 3—3 in FIG. 1.

With reference to FIGS. 1, 2 and 3, the apparatus, generally designated by the number 10, comprises a base 12 which rests on the floor. The base 12 has vertically extending support members 14 and 16 mounted at both ends of base 12. Mounted on the upper ends of support members 14 and 16 are bearings 18 and 20 which rotatably support a fixture assembly 22. Fixture assembly 22 comprises shafts 24 and 26 which are supported by bearings 18 and 20 and which are connected to mounting plates 28 and 30, respectively. Mounting plates 28 and 30 are respectively bolted to end plates 32 and 34 between which is welded a fixture base member 36. Four bolster support pins 35, 36, 37 and 38 are attached to and extend upwardly from the upper surface of base member 36. Mounted on plate 32 is a threaded end clamp 40 which can be moved in and out by rotation of nut 41. A similar end clamp 42 is mounted on plate 34. Welded to each side of base member 36 are flanges 44 on which are mounted side clamps 46, 47, 48 and 49. Clamp 46 is connected by a chain 50 so that both clamps 46 and 47 are rotated simultaneously by crank handle 51. Clamps 48 and 49 are independently rotatable and are tightened by a wrench to assure that a railroad wheel truck bolster 52 is rigidly clamped to fixture 22 as will be more fully described hereinafter.

Figure 5:
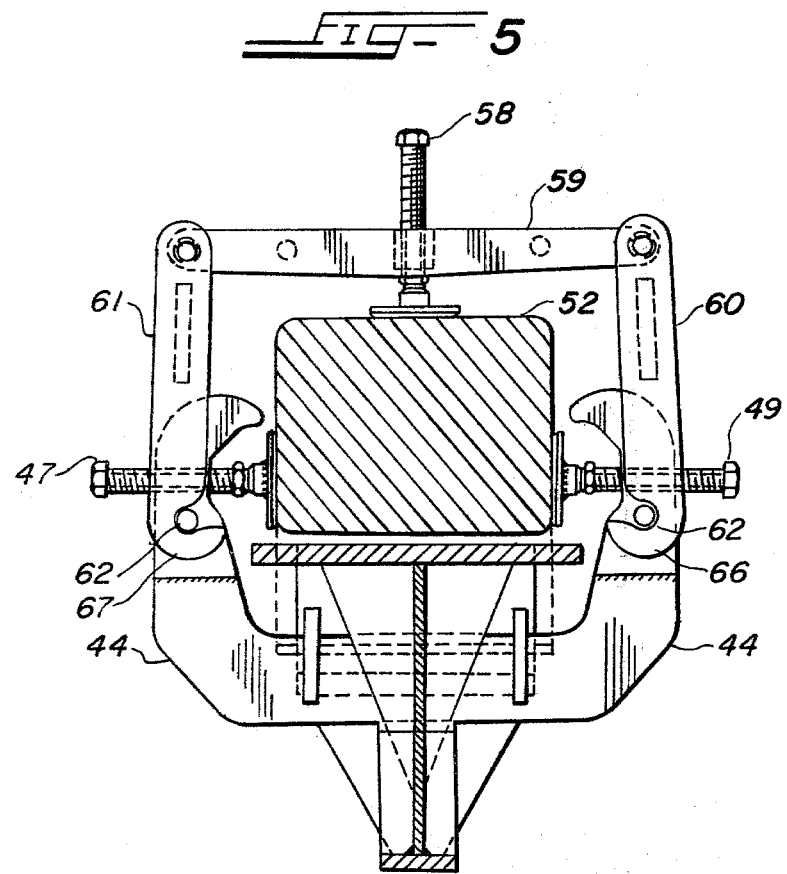
FIG. 5 is a view taken substantially along line 5—5 in FIG. 3.

Bolster 52 is supported on bolster support pins 35, 37, 38 and 39 and clamped at its ends and sides by clamps 40 and 42 and 46-49. With reference to FIGS. 2 and 5, top clamps 54 and 56 are identical and comprise a threaded bolt 58 threaded through a linear member 59 which has gripping arms 60 and 61 pivotably mounted at each end thereof. The ends of gripping arms 60 and 61 are formed into hooks 66 and 67 which grip pins 62 and 63 extending through flanges 44. Top clamps 54 and 56, as can be seen, may be easily removed by loosening bolt 58 and removing hooks 66 and 67 from pins 62 and 63 to allow the bolster 52 to be removed from the fixture 22 in an upward direction.

A motor and gear reducer 64 is mounted on support member 16 and the output shaft 65 of motor and gear reducer 64 is connected to the end of shaft 26. Thus, operation of motor 64 will cause fixture assembly 22 to rotate as will be more fully described below.

Figure 4:
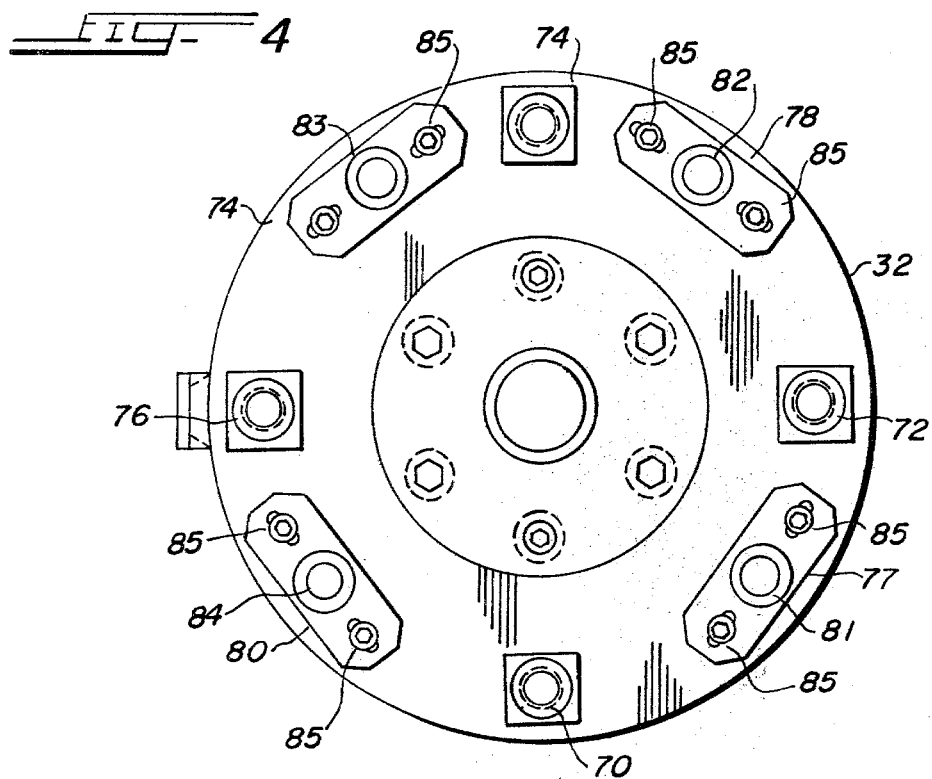
FIG. 4 is a view taken substantially along line 4—4 in FIG. 3.

With reference to FIG. 4, a plane view of the face of plate 32 is illustrated. Plate 32 has a plurality of openings 70, 72, 74 and 76 formed in the face thereof at 90° intervals along an equal radius from the center. In addition, mounted at predetermined angular positions about the face of plate 32 by bolts 86 are a plurality of plates 77, 78, 79 and 80 having formed therein openings 81, 82, 83 and 84, respectively. The center of openings 81-84 are on the same radius as the center of openings 70-76. By loosening bolts 85, plates 77-80 can be adjusted in an angular position for reasons that will be described below.

With reference to FIG. 3, inserted into opening 70 is a plunger pin 86 that is mounted for linear sliding movement on support member 14. The opposite end of plunger pin 86 is connected to the piston rod 88 of a pneumatic cylinder 90 that is controllable from control box 92 to cause plunger pin 86 to move in and out of the openings on plate 32 as a result of operator control. Control box 92 also controls the operation of motor 64 to rotate the fixture assembly 22 once plunger pin 86 gas been withdrawn from the openings in plate 32.

Apparatus 10 also includes a first milling assembly 100 (see FIGS. 2 and 3). First milling assembly 100 comprises longitudinal tracks 102 which are mounted on base 12 and which run parallel to the direction of the axis of rotation of fixture 22. Mounted for sliding movement on tracks 102 is a trolley bed 104 (see FIG. 2). Trolley bed 104 supports longitudinal tracks 106, and another smaller trolley bed 108 slides on tracks 106 in a horizontal direction perpendicular to the axis of rotation of fixture 22. Mounted on trolley bed 108 are vertically extending columns 110 upon which is slidably mounted a first milling head 112. A motor 114 drives milling head 112 and causes any tools mounted in milling head 112 to rotate at a controllable speed.

A series of hydraulic cylinders control the movement of first milling head 112. Hydraulic cylinder 116 (see FIG. 1) controls the movement of trolley bed 104 along tracks 102. Hydraulic cylinder 118 (see FIG. 2) controls the movement of trolley bed 108 along tracks 106. Finally, hydraulic cylinder 120 controls the movement of first milling head 112 along columns 110. A control box 122 controls the movement of milling head 112 in all three axes as well as controlling starting and stopping of motor 114.

Apparatus 10 also comprises a second boring/facing assembly 130 (see FIG. 2) which includes a set of tracks 132 upon which is slidably mounted a trolley bed 134. Trolley bed 134 supports a second set of tracks 136 upon which is slidably mounted a second trolley bed 138. Mounted on trolley bed 138 is second boring/facing head 140 which is driven by motor 142. Second boring/facing head 140 has a combination boring and facing tool 144 rotatably mounted thereon which is rotated by motor 142.

The movement of trolley bed 134 on tracks 132 is controlled by a hydraulic cylinder 146, and the movement of trolley bed 138 on tracks 136 is controlled by crank handle 148. A control box 150 controls the operation of motor 142 and hydraulic cylinder 146 as well as the operation of combination boring and facing tool 144 as will be more fully described below.

The remaining description of the preferred embodiment can be more readily understood by describing the operation of the preferred embodiment. With reference to FIG. 3, with fixture 22 in the position illustrated in FIG. 3 with pin 86 in hole 70 of plate 32, and top clamps 54 and 56 removed, a bolster 52 is lowered onto fixture 22 until it rests essentially in the position shown in FIGS. 1, 2 and 3 on bolster support pins 36–39. Clamps 40, 42, 46, 47 48 and 49 are loosened so that the bolster can be easily moved on fixture 22.

With reference to FIGS. 6 and 7, a locating template 160 is used to properly locate bolster 52 on fixture 22. The locating template 160 comprises a linear member 162 which has two pins 164 mounted at each end thereof. Pins 164 are dimensioned to be insertable into the hollow interior of locating guides 166 which are welded to flanges 44 on each side of fixture 22. Threaded through the center of member 162 is a bolt 168, and mounted on the lower end of bolt 168 is a locating guide 170. Guide 170 is dimensioned to just fit into the bolster bowl area of bolster 52 when bolster 52 is in the proper position for machining. Once the bolster 52 is properly located, the clamps 40, 42, 46–49 are tightened to rigidly attach bolster 52 to fixture 22. After clamps 40, 42, and 46–49 have been clamped, locating guide 170 can be removed so that upper clamps 54 and 56 can be attached as previously described and bolts 58 and 59 tightened to hold bolster 52 against support pins 36–39.

Locating template 160 is designed so that locating guide 170 can be removed from bolt 168 and a different size guide can be attached for use with different sized bolsters to assure that regardless of the size and type of bolster, it can be properly positioned on fixture 22.

Figure 8:
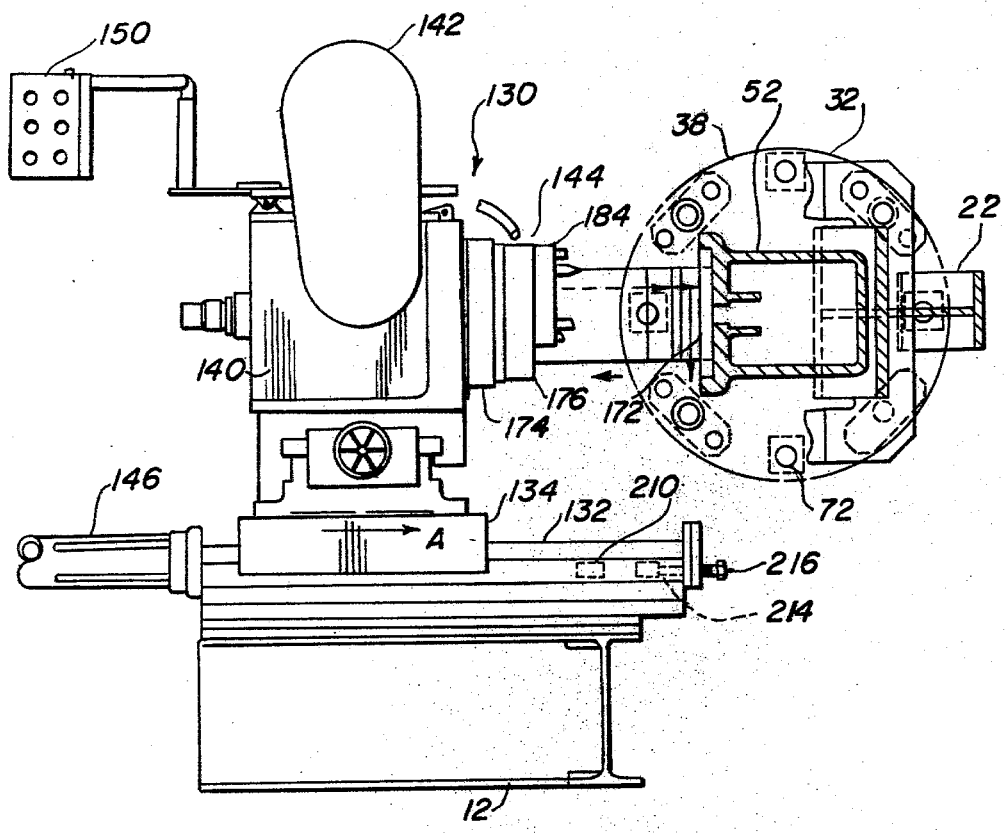
FIG. 8 is a side partially fragmentary view of the second machining head showing the position of the fixture and bolster and the positions of the second machining head during machining of the bolster bowl surface.

Once the bolster 52 is properly located on and clamped to fixture 22, the machining operations can commence. First, pin 86 is withdrawn from hole 70 in plate 32 by the operation of hydraulic cylinder 90, and motor 64 is operated to rotate the fixture 22 until hole 72 in plate 32 is aligned with pin 86. Pin 86 is then inserted into hole 72 in plate 32 to lock the fixture 22 in a position 90° from its original position. With reference to FIG. 8, the position of the fixture and bolster 52 in relation to second machining assembly 130 is illustrated. Combination boring and facing tool 144 may then be used to machine the bolster bowl surface 172 of bolster 152.

With reference to FIGS. 19 and 20, a more detailed illustration of the combination boring and facing tool 144 is illustrated. Tool 144 is attached to spindle 174 of second milling head 140. Tool 144 comprises a circular slide block 176 that has a tapered groove 178 in which a slide member 180 is mounted for sliding movement. A mechanism (not shown) which is controlled by the operator through control box 150 causes slide member 180 to move through groove 178 (from the position illustrated by solid lines in FIG. 20 to the position illustrated by dotted lines and identified 180') as spindle 174 and slide block 176 are being rotated by motor 142.

Mounted on slide member 180 by bolts 182 is a tool block 184. Mounted and retained in a square opening 186 in tool block 184 by set screws 190 is a boring cutting tool 188. Similarly, mounted and retained in a square hole 192 in tool block 184 by set screws 196 is a facing cutting tool 194. Mounted and retained in a square hole 198 in tool block 184 by set screws 202 is a second facing and cutting tool 200, and a welding groove cutting tool 204 is positioned and retained in a hole 206 in block 184 by set screws 206.

Figure 9:
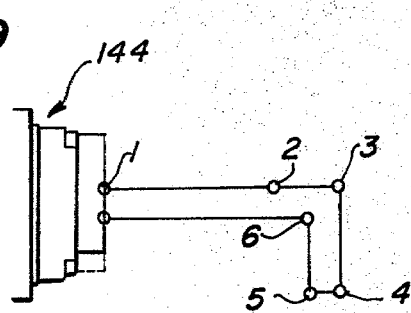
FIG. 9 is a schematic view showing the relative positions of the boring and facing tool of the second machining head during machining of the bolster bowl surface.

With reference to FIGS. 8, 9 and 19, with spindle 174 spinning at cutting speed, the automatic cycle button of control box 150 is actuated. Cylinder 146 then causes second machining assembly 130 to commence moving in the direction of arrow A in FIG. 8. With reference to FIG. 9, head 144 moves very rapidly between position 1 and 2 until trolley bed 134 engages a limit switch 210 (shown in dotted lines) at position 2. The actuation of limit switch 210 causes the feed rate of hydraulic cylinder 146 to be slowed to a cutting feed rate. The head then advances from position 2 to 3 at a slow rate so that boring cutting tool 188 can bore the bolster bowl surface 172 removing the portion designated 212 in FIG. 19. At position 3, the trolley bed 134 engages a second limit switch 214, the position of which is controlled by an adjustable bolt 216. Limit switch 214 is adjusted so that the advance of the combination tool 144 is stopped when the facing tools 194 and 200 reach the positions illustrated by the dotted lines in FIG. 19 at the proper facing depth of bolster bowl 172. Operation of switch 214 causes the mechanism (not shown) of head 144 to commence moving slide member 180 through groove 178 (in the direction of arrow B in FIGS. 19 and 20) as the spindle 174, slide block 176, and tool block 184 are rotated by motor 142. In this manner, the bolster bowl surface 172 is faced so that the surface 218 (indicated by dotted lines in FIG. 19) is removed. Slide member 180 continues to slide through tapered groove 178 until position 4 (FIG. 9) is reached at which time the slide member 180 is in the position illustrated by the dotted lines designated 180' in FIG. 20. In position 4, welding groove cutting tool 4 is in the position illustrated by the dotted lines in FIG. 19 cutting a welding groove around the periphery of the bolster bowl 172. When position 4 is reached, cylinder 146 is operated in a reverse direction to cause the head to retract to position 5 and ultimately back to position 1 ready for the next machining operation.

Thus, as can be seen, the entire bolster bowl surface 172 of the bolster 52 is machined by a single operation. The respective boring and facing tools are pre-adjusted and pre-aligned and the limit switch is set so that once the bolster is properly positioned on the fixture 22 by the use of the locating template 160 illustrated in FIGS. 6 and 7, the machining operation can be performed automatically.

To machine the bolster pockets of bolster 52, it is necessary to pivot fixture 22 to properly align the pockets for machining. With reference to FIG. 4, openings 81, 82, 83, and 84 are arranged and adjusted to permit machining of the bolster pockets. Since various types of truck bolsters, such as ASF, National CU-1, Barber, and Buckeye, have bolster pockets which are formed at different angular configurations, it is necessary to provide a means of adjustment of openings 81–84 on plate 32 so that all types of bolsters can be accommodated. For example, the bolsters typically have bolster pockets which are angled at either 35° or 37½°. By loosening bolts 85 on plates 77–80, the openings 81–84 can be adjusted to accommodate these angles for the various types of bolsters so that the fixture 22 can be locked at various angles placing the bolster pocket surfaces either parallel to or perpendicular to the cutting tool depending on the type of cutting tool used.

With particular reference to FIG. 10, a 1½ inch diameter by 6 inch long hog mill 220 is mounted on first machining head 112. Fixture 22 is pivoted until opening 82 on plate 32 is aligned with pin 86 and pin 86 is inserted locking the fixture in the position illustrated in FIG. 10 with bolster pocket surface 224 parallel to the cutting surface of hog mill 220.

Figure 11:
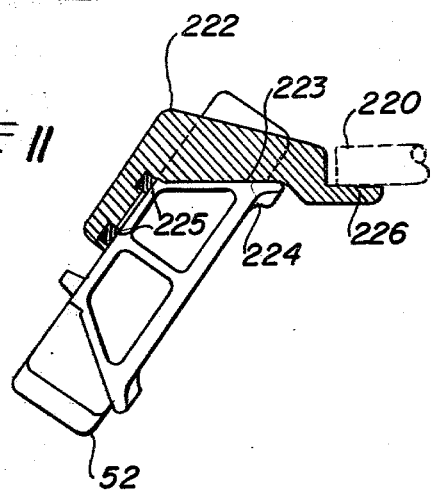
FIG. 11 is a cross-sectional view showing the bolster pocket of the bolster and a gauge used to adjust for proper machining depth of the bolster pockets.

With reference to FIG. 11, a bolster pocket machining gauge 222 is positioned so that surface 223 contacts bolster pocket surface 224. Magnets 225 hold the gauge 222 in the proper position. Tool 220 is then moved until it just engages surface 226 of gauge 222. The vertical travel and depth of cut can then be set using vertical measuring scale 228 (see FIG. 12). Once the proper depth of cut has been set, the bolster pocket can be machined as illustrated in FIG. 13. The head 112 is moved downwardly from position "a" to position "b". Position "b" is at a depth determined using gauge 222. Cross feed controls are then operated causing the tool to move across the bolster pocket surface to position "c" causing the machining operation to occur. Finally, the tool is retracted from position "c" to "d" in an upward direction and the machine assembly 100 is moved away from the bolster so that it may be pivoted for the next operation.

After all the bolster pockets have been machined, the fixture can then be pivoted for machining the fulcrum pin hole of the bolster 52. With reference to FIGS. 14 and 15, the fulcrum pin hole 230 is located on a flange 232 on one side of bolster 52. The fixture 22 is rotated 90° from the original vertical position so that pin 86 can be inserted into opening 72 and plate 32. An end mill 234 of the proper diameter for machining the fulcrum pin hole is installed in head 112. Head 112 is then oriented under manual control until it is centered on hole 230. Motor 114 is then operated to cause mill 234 to rotate rapidly and head 15 is moved in the direction of arrow D in FIG. 15 until the fulcrum pin hole 230 has been machined. The first milling head 112 is then retracted opposite direction of arrow D in FIG. 15 to the original position.

Finally, to machine the bolster gib surfaces of the bolster 52, the fixture 22 is rotated until it is in the vertical position as illustrated in FIGS. 1, 2 and 3. Pin 86 is inserted into hole 70 thereby locking the fixture in that position.

Figure 16:
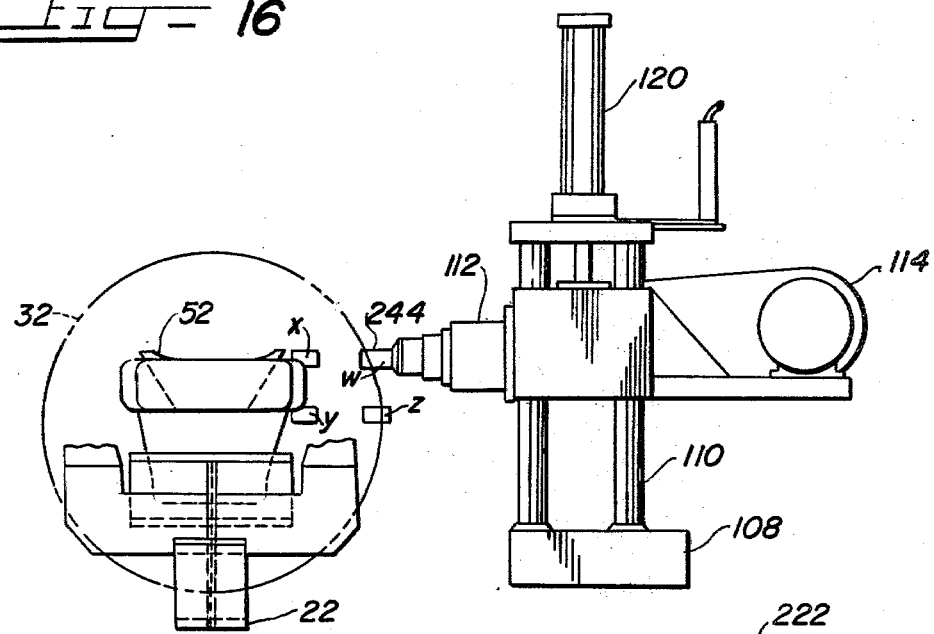
FIG. 16 is a side partially fragmentary view of the first machining head and the fixture and bolster showing the position of the fixture and the head during the machining of the bolster gib surfaces.
Figure 17:
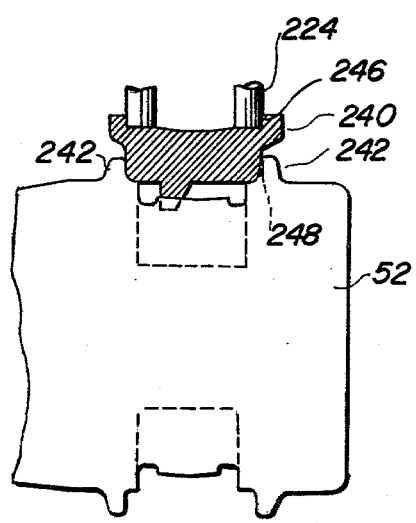
FIG. 17 is a top partially fragmentary view of the end of the bolster showing a gauge for properly aligning the machining tool for the proper depth of cut when machining the bolster gib surfaces.

With reference to FIG. 17, once the bolster has been oriented in the vertical position, a gauge 240 is set between the bolster gibs 242 and tool 244 is positioned until it engages surface 246 of gauge 240. In this position, the tool is at the proper depth for machining the surface 248 of gib 242. The gauge 240 is then removed, and the first machining head 112 is moved through the positions designated w, x, y, and z in FIG. 16 and FIG. 18 thereby machining the bolster gib surfaces. Each bolster gib surface can be machined in the same manner until all surfaces are machined.

Upon completion of the machining of the bolster gib surfaces, machining of the bolster 52 has been completed and the bolster may be removed by loosening the clamps and lifting the bolster 52 from the fixture 22 with a crane or winch.

It should be apparent from the foregoing that the present invention provides a single apparatus which allows complete machining of the critical wear surfaces of a railroad truck bolster without the necessity of removing the bolster from the apparatus once it is properly positioned and clamped on the rotating fixture. Heretofore, it was necessary to use several different types of machining equipment to accomplish the various machining tasks performed by the single apparatus illustrated and described herein. Accordingly, the present invention provides substantial advantages and savings.

It should also be apparent from the foregoing that various changes, alterations, or modifications may be made to the embodiment described and illustrated herein without departing from the spirit and scope of the present invention as defined in the appended claims.

We claim:

1. An apparatus for machining railroad wheel truck bolsters comprising:
    a base;
    a fixture mounted for rotation about an axis on said base, said fixture including clamp means to clamp the truck bolster on said fixture in a predetermined position;
    rotating means for rotating said fixture about said axis to different predetermined positions so that the truck bolster may be oriented in proper position for machining various critical surfaces of the bolster;
    lock means for locking said fixture in a selected one of said predetermined positions;
    a first machining head mounted on one side of said fixture for sliding movement in a first direction horizontally and parallel to the axis of rotation of said fixture, in a second direction horizontally and perpendicularly to the axis of rotation of said fixture, and in a third direction vertically and perpendicularly to the axis of rotation of said fixture so that certain of said various critical surfaces of the bolster can be machined by said first machining head when said fixture is in certain ones of said predetermined position;
    a second machining head mounted on the other side of said fixture for movement in a direction horizontally and perpendicularly to the axis of rotation of said fixture, said machining head having a combined boring and facing tool mounted for rotation on said machining head said boring and facing tool adapted to machine the bolster bowl surface of the bolster when said fixture is in one of said predetermined positions.

2. An apparatus, as claimed in claim 1, wherein the certain critical surfaces are the bolster pocket surfaces of the bolster, and said lock means is adapted to lock said fixture in a plurality of different positions such that said first machining head will be at the proper angular relationship with the bolster pocket surfaces for proper machining.

3. An apparatus, as claimed in claim 1, wherein the certain critical surfaces are the fulcrum pin hole surface of the bolster and said lock means can lock said fixture in proper angular alignment with said first machining head so that said first machining head can machine the fulcrum pin hole surface.

4. An apparatus, as claimed in claim 1, wherein the certain critical surfaces are the bolster gib surfaces of the bolster and said lock means can lock said fixture in proper angular alignment with said first machining head so that said first machining head can machine the bolster gib surfaces.

5. An apparatus, as claimed in claim 1, further comprising locating means for properly positioning the bolster on said fixture before said clamp means clamps the bolster on said fixture so that said bolster bowl surface and said certain critical surfaces are properly positioned for machining.

6. An apparatus, as claimed in claim 5, wherein said locating means comprises support pins for supporting the bolster on said fixture and a locating template that is attachable to said fixture at a preselected position such that when the bolster bowl of the bolster is aligned with said template, the bolster is in the proper position for machining.

7. An apparatus, as claimed in claim 1, wherein said lock means comprises a plate mounted at one end of said fixture, said plate having openings therein radially aligned around the axis of rotation of said fixture at the predetermined positions, and a plunger pin mounted for sliding movement on said base, said plunger pin being movable in a first direction to engage said openings in said plate thereby locking said fixture, and said plunger pin being movable in a second direction to disengage said openings in said plate thereby unlocking said fixture.

8. An apparatus, as claimed in claim 7, wherein said lock means further comprises operator controllable operating means for moving said plunger pin in said first and second directions.

9. An apparatus, as claimed in claim 7, wherein said plate includes a plurality of smaller plates having certain of said openings therein, said smaller plates being adjustable so that the angular position of certain of said openings can be adjusted to allow said fixture to be properly positioned for different configurations of bolsters.

10. An apparatus, as claimed in claim 2, further including gauge means attachable on said bolster pocket surfaces for permitting adjustment for a predetermined depth of machining cut of said bolster pocket surface.

11. An apparatus, as claimed in claim 4, further including gauge means attachable to said bolster gib surfaces for permitting adjustment for a predetermined depth of cut of said bolster gib surfaces.

* * * * *